Jan. 20, 1931.                H. R. PHILLIPS ET AL                1,789,837
                    SLAB OR BLOCK FEEDING AND CUTTING MACHINE
                         Filed Nov. 19, 1929        10 Sheets-Sheet 5
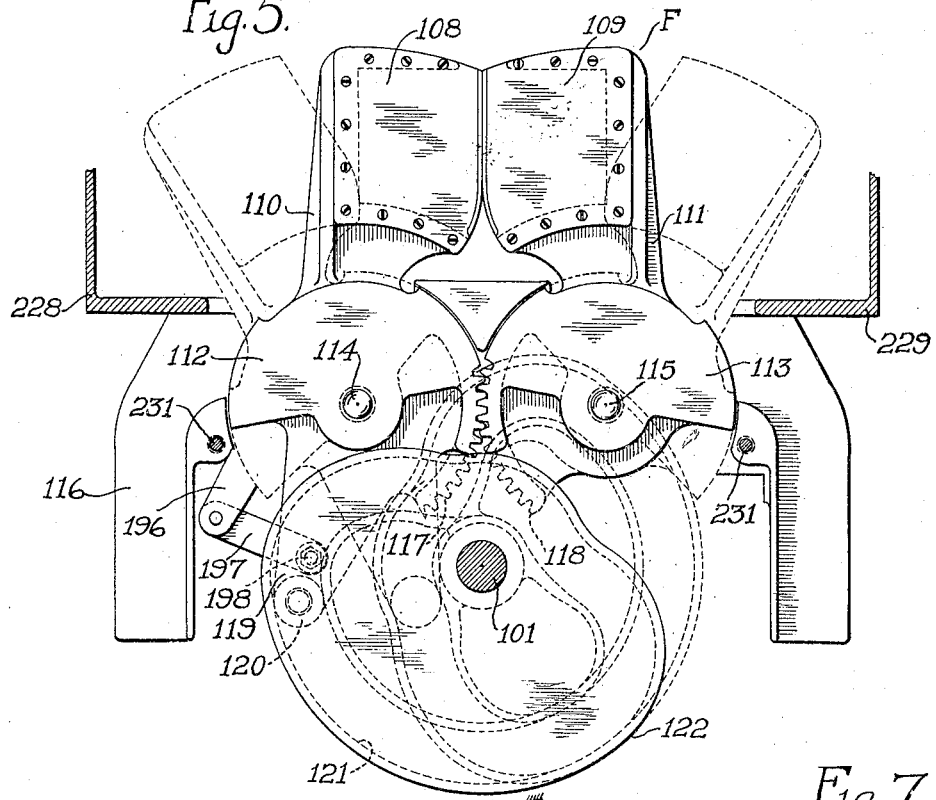
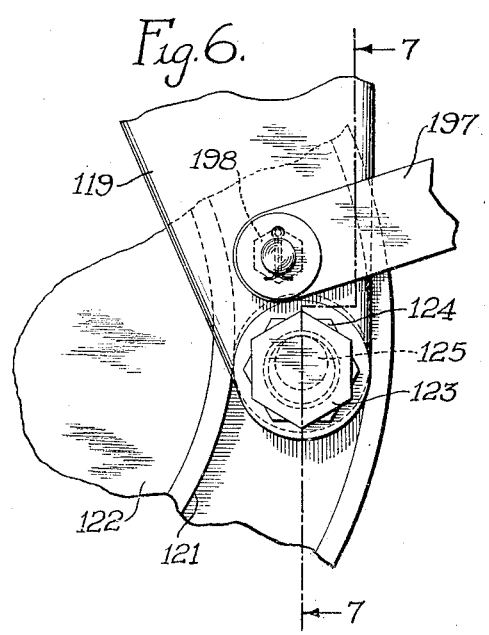
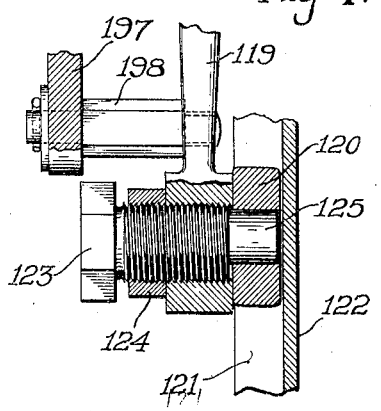
INVENTORS.
Harley R. Phillips
Henry J. Clarke
by Thomas H. Ferguson
        ATTORNEY.

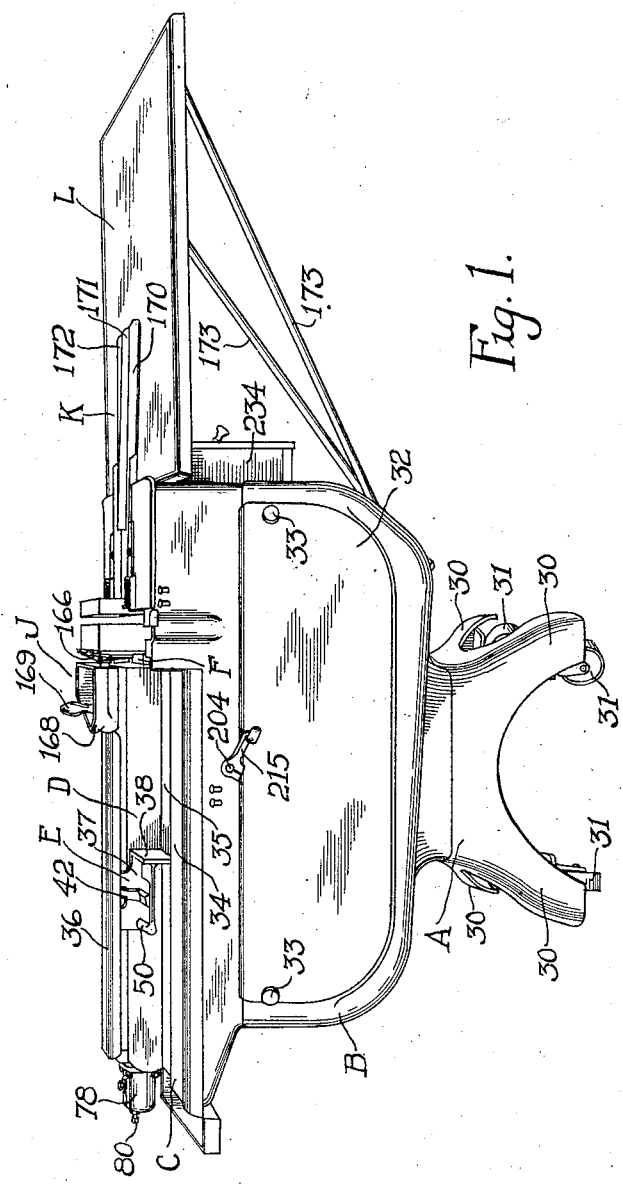

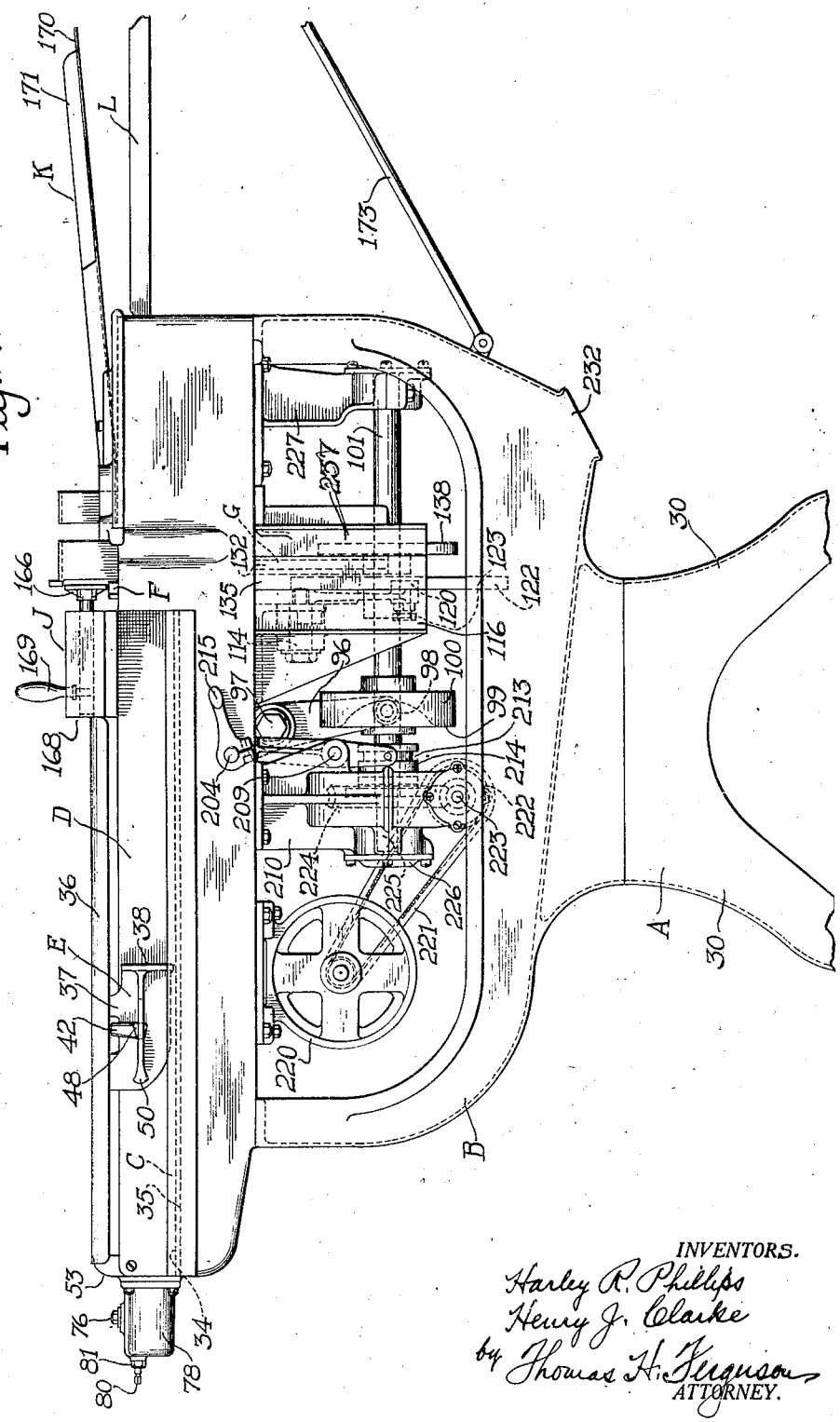

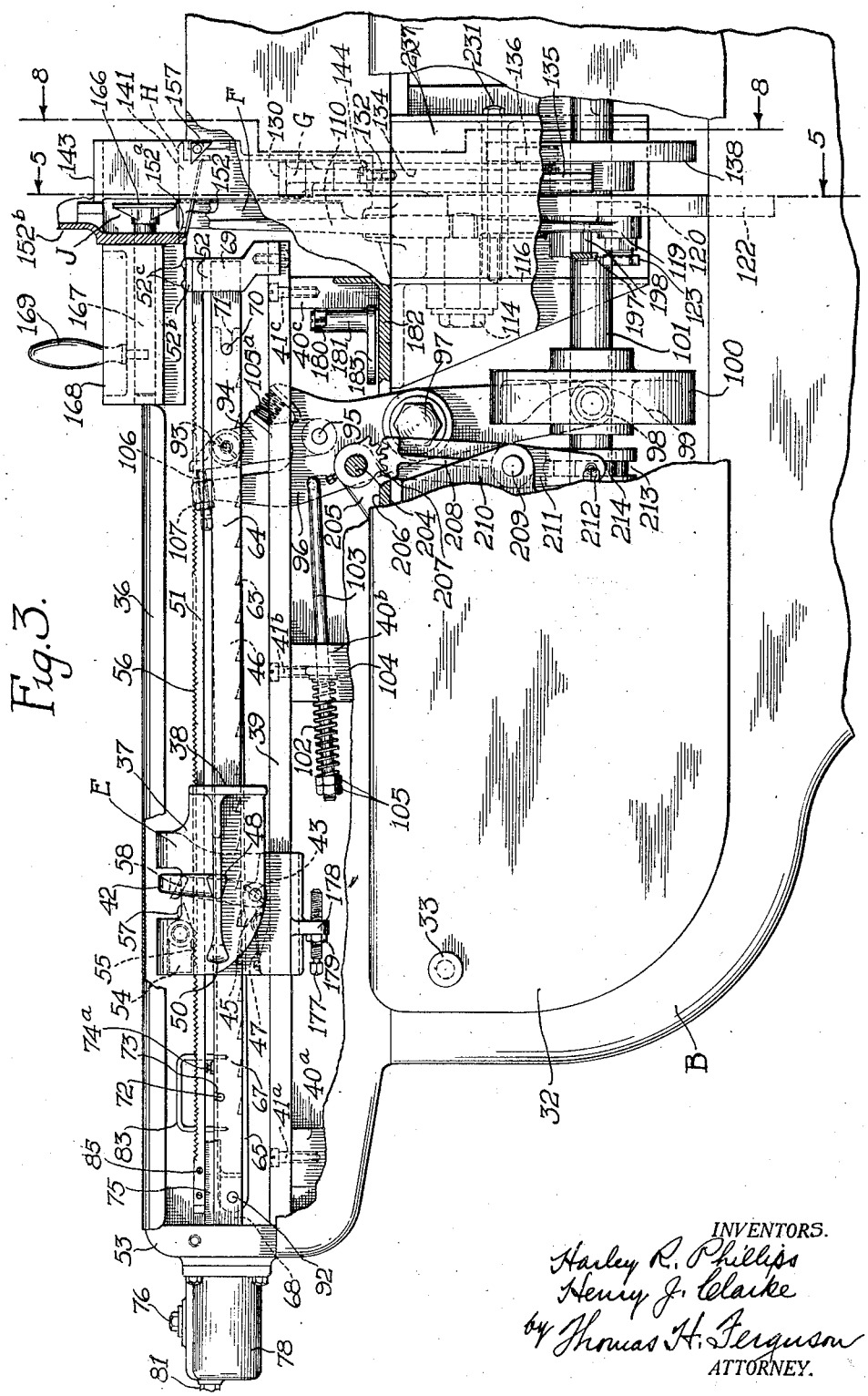

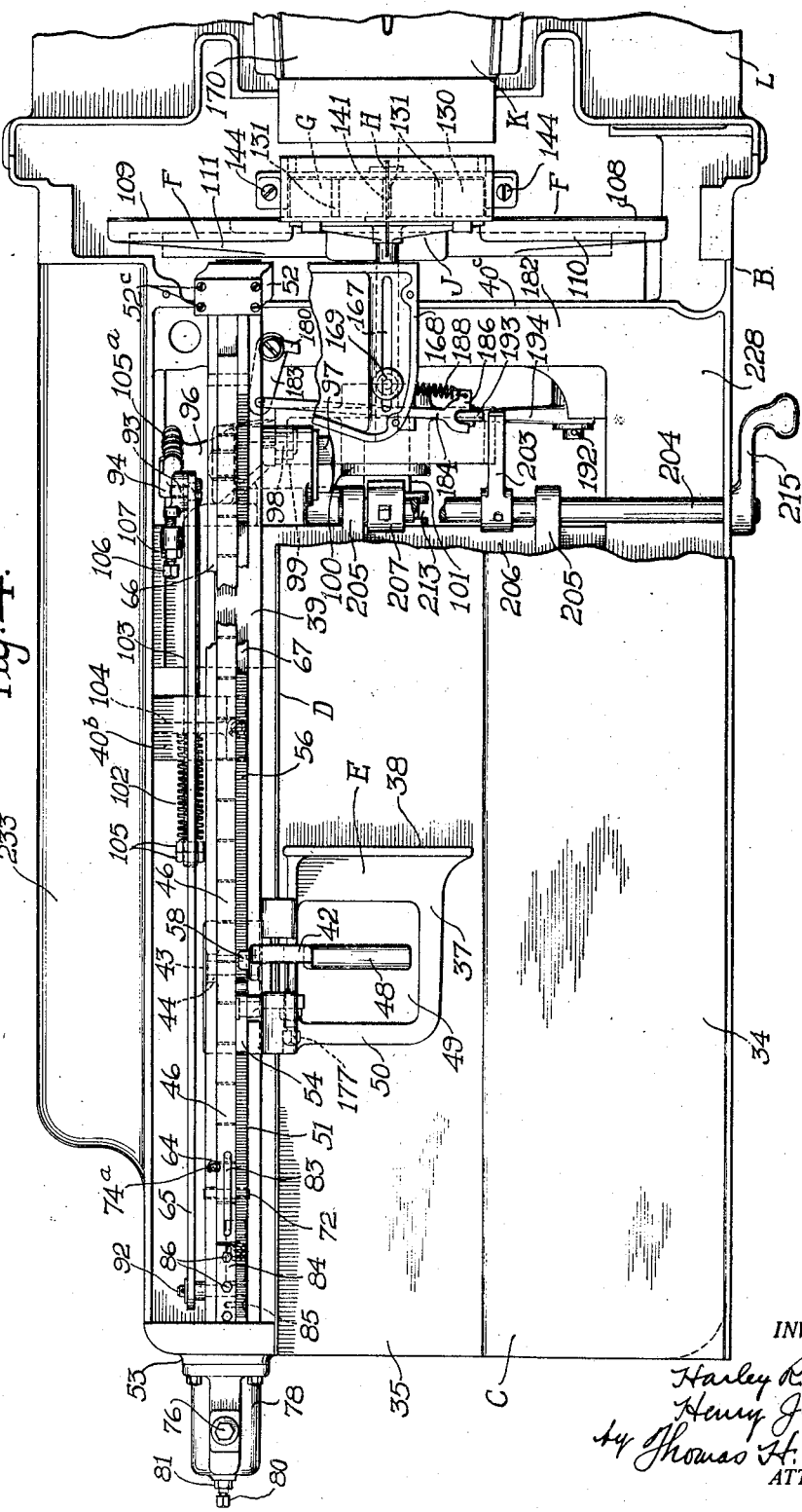

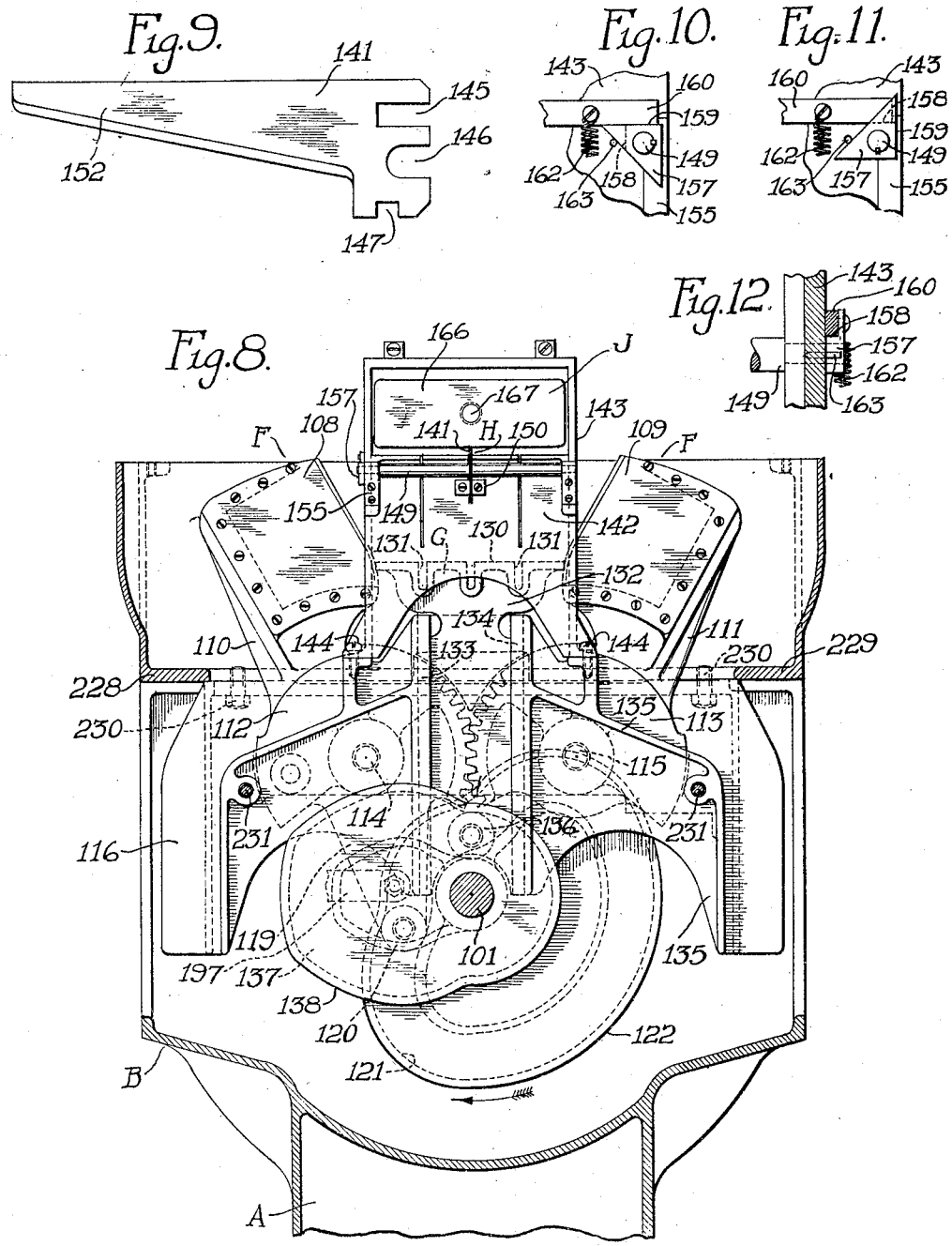

Jan. 20, 1931.  H. R. PHILLIPS ET AL  1,789,837
SLAB OR BLOCK FEEDING AND CUTTING MACHINE
Filed Nov. 19, 1929   10 Sheets-Sheet 7
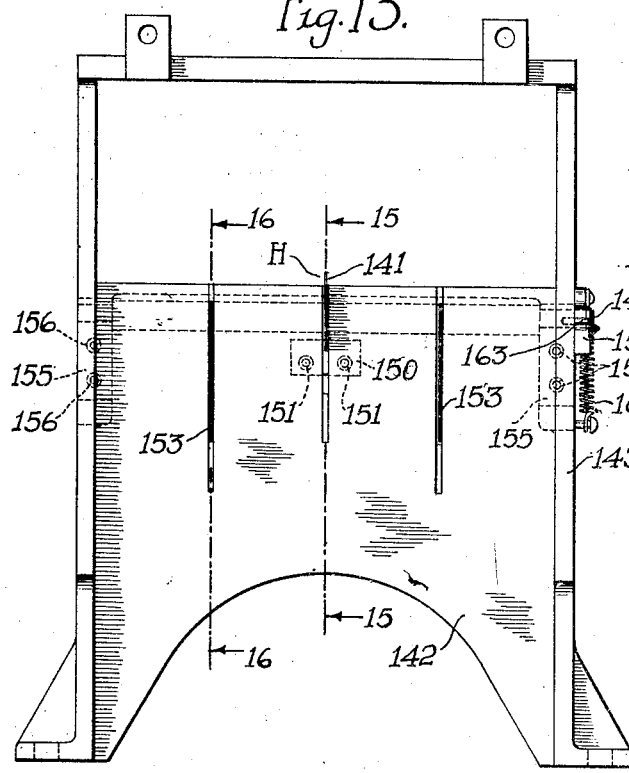
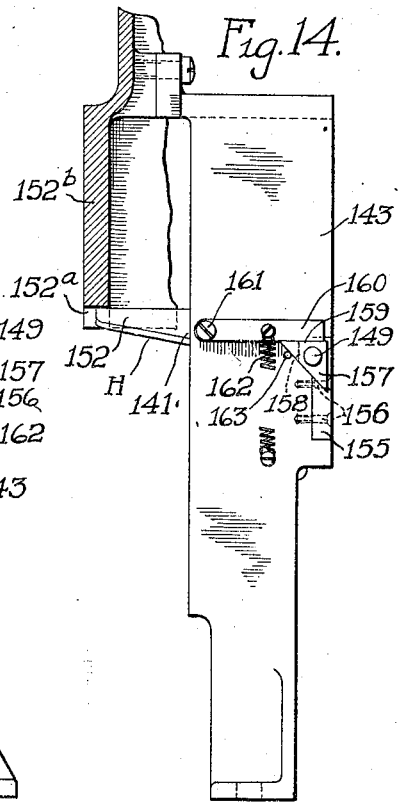
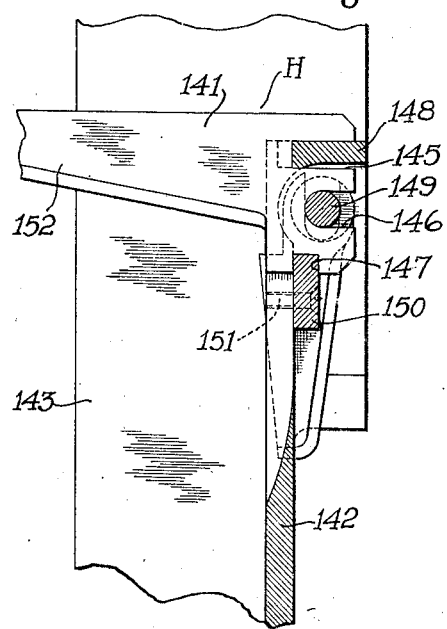
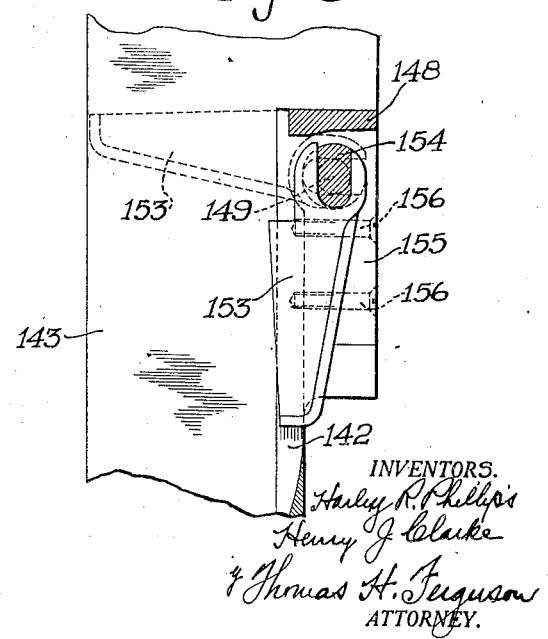
INVENTORS.
Harley R. Phillips
Henry J. Clarke
& Thomas H. Ferguson
ATTORNEY.

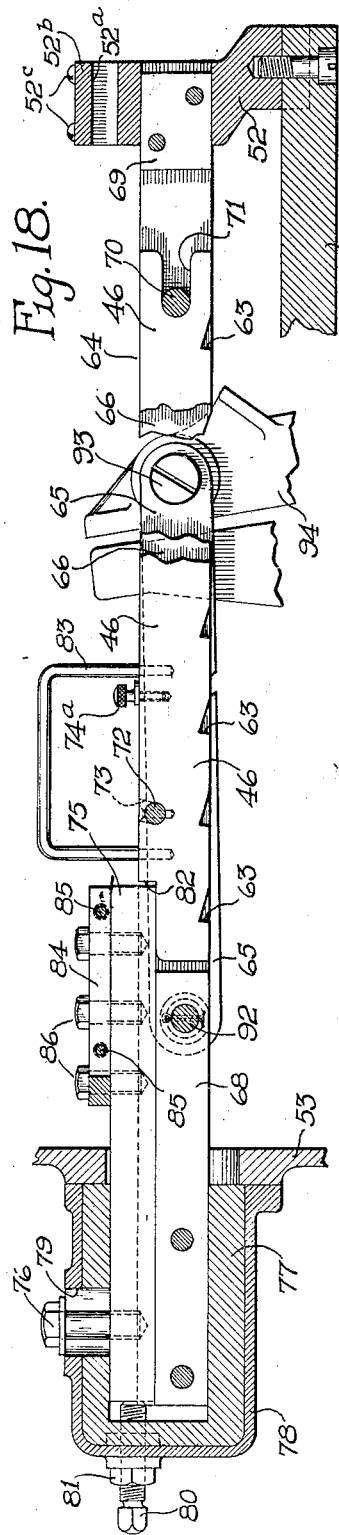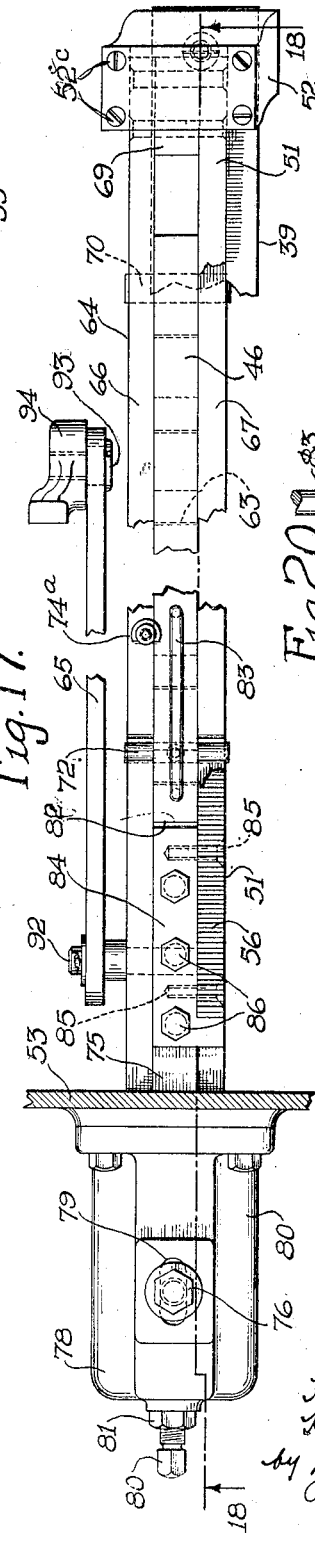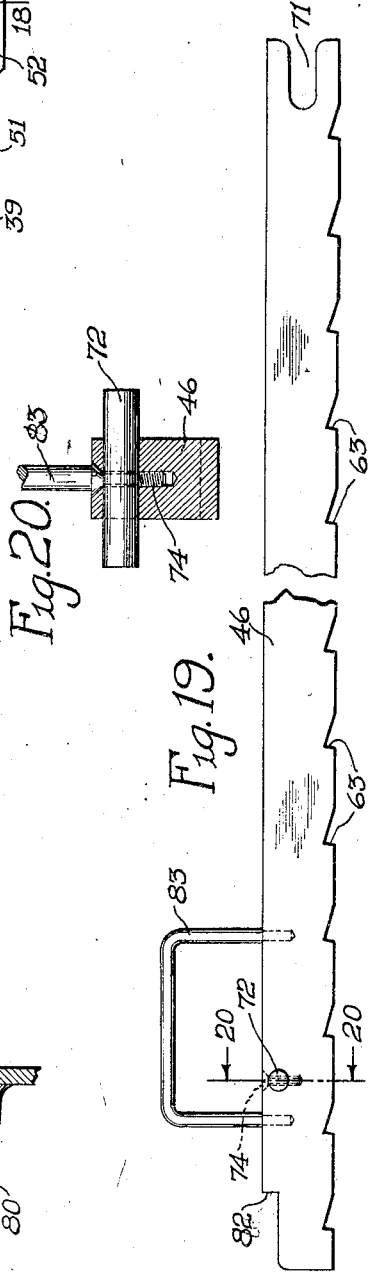

Jan. 20, 1931. H. R. PHILLIPS ET AL 1,789,837
SLAB OR BLOCK FEEDING AND CUTTING MACHINE
Filed Nov. 19, 1929 10 Sheets-Sheet 9
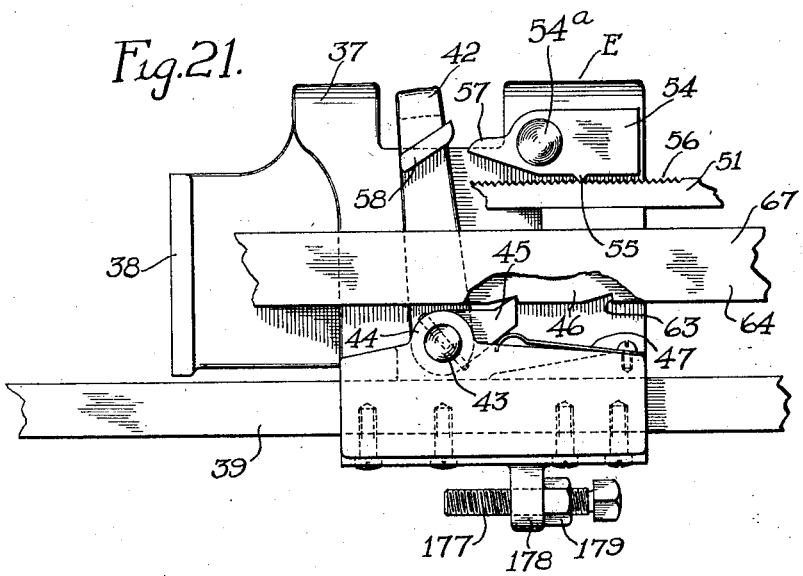
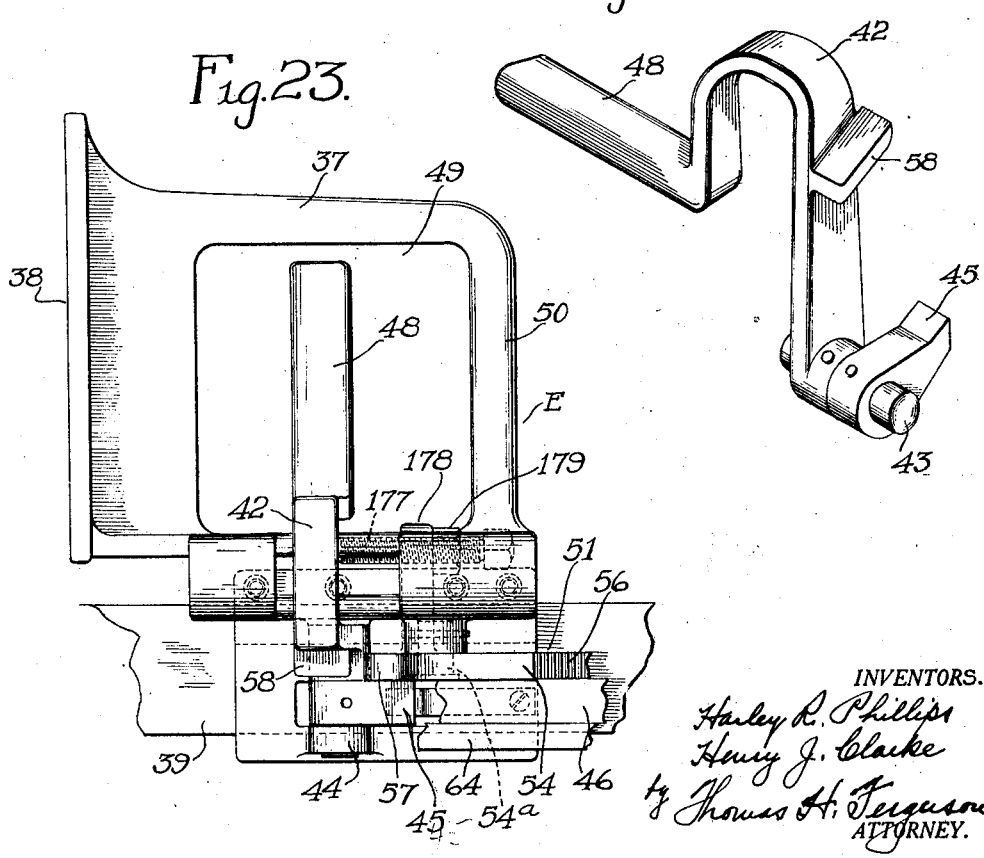
INVENTORS.
Harley R. Phillips
Henry J. Clarke
by Thomas H. Ferguson
ATTORNEY.

Jan. 20, 1931.  H. R. PHILLIPS ET AL  1,789,837
SLAB OR BLOCK FEEDING AND CUTTING MACHINE
Filed Nov. 19, 1929  10 Sheets-Sheet 10

INVENTORS.
Harley R. Phillips
Henry J. Clarke
by Thomas H. Ferguson
ATTORNEY.

Patented Jan. 20, 1931

1,789,837

UNITED STATES PATENT OFFICE

HARLEY R. PHILLIPS, OF OAK PARK, AND HENRY J. CLARKE, OF CHICAGO, ILLINOIS, ASSIGNORS TO MOJONNIER BROS. CO., A CORPORATION OF ILLINOIS

SLAB OR BLOCK FEEDING AND CUTTING MACHINE

Application filed November 19, 1929. Serial No. 408,367.

This invention relates to machines for feeding and cutting slabs or blocks of material into sections or slices. When so cut, the sections or slices may be wrapped or not, as desired, some materials being preferably wrapped and some not. The machine constituting the preferred embodiment of the invention is designed primarily for cutting ice cream in this manner. Ordinarily, slices of ice cream are wrapped and placed in boxes or cartons for delivery to the customers. Obviously, the machine illustrating the preferred embodiment may be used to cut slabs of other plastic substances. Indeed, the machine may be used for cutting slabs or blocks of material that is quite hard and rigid, since the machine herein disclosed must cut ice cream when it is at a very low temperature and decidedly hard and rigid.

The particular type of machine to which we have applied the different features of our invention comprises a table upon which the slab of ice cream is laid, a follower which presses against the rear end of the slab and advances it step by step over the table, cutters at the forward end of the table which cut off the slices from the slab, an elevator which raises each slice after it is cut off, additional knives for still further cutting the slice as it rises, and finally an ejector for pushing the slice, whether whole or divided into parts, from the elevator on to a delivery table where the delivered product may be wrapped and packaged, or otherwise treated, as desired.

The features of the invention have to do with the feeding and cutting of the material. In developing the machine herein disclosed, we have also developed paper feeding and wrapping features, but these are to be presented in a separate application.

One feature of the invention is the novel follower. It has a two part hand hold which may be readily grasped by the operator to free the follower from the driving mechanism so that it may be moved back to a new starting position.

Another feature is a novel feed bar carrier fitted to receive different feed bars suited to give different numbers of slices per slab. A set of feed bars is provided for this purpose. When a particular number of slices per slab is wanted, then the appropriate bar is selected and placed in the carrier. The new carrier has novel means for holding the feed bar in place. It also employs retaining mechanism which is strong and suits the machine to cutting ice cream at a very low temperature.

When ice cream is very hard it is difficult to cut, especially for a machine designed to cut rapidly and during long periods of time without rest, yet many ice cream manufacturers make a very hard slab and would not be satisfied with a softer product. Therefore, the feed mechanism and other parts of the machine herein disclosed have had to be worked out with a view to meeting this requirement of the trade.

Another feature of the invention resides in the novel knife mechanism by which the slices are cut from the slab. This mechanism has been developed also with the requirement of cutting hard ice cream in view. One novel part of the cutting mechanism is the new adjusting means by which the knives are nicely and easily adjusted to compensate for wear.

Another feature is found in the knives by which a severed slice is divided into smaller pieces. By a simple arrangement extra knives may be thrown into and out of service for the purpose of dividing the slice into different numbers of parts.

Another feature is the tripping of the main clutch of the machine to stop it whenever the follower reaches the end of its travel and the slab is completely sliced.

It is the object of the invention to provide a machine capable of functioning as pointed out, and embodying all the novel features enumerated, while at the same time being compact in construction, efficient and economical in operation, and able to handle a large amount of material conveniently and expeditiously.

The machine presented herewith as embracing the several features of the invention is a development of, and an improvement upon, that shown in application Serial No.

190,359, filed May 10, 1927, which has become Patent No. 1,751,585.

Having briefly pointed out the several features of the invention, reference may now be had to the following detailed description taken in connection with the accompanying drawings, which description and drawings set forth a machine constituting the preferred embodiment of the invention. For a measure of the scope of the invention reference should be had to the appended claims.

In said drawings:

Fig. 1 is a perspective view of a machine constructed and arranged in accordance with the present invention;

Fig. 2 is a side elevation of the same with a cover of the casing removed to show the motor, drive shaft, cam shaft, cams and other parts by which the mechanisms of the machine are operated;

Fig. 3 is a side elevation of a portion of the machine illustrating particularly the material feeding mechanism and the cam shaft connections by which that mechanism is operated;

Fig. 4 is a partial plan view of the machine illustrating particularly the feed mechanism and the clutch tripping mechanism by which the machine is stopped when the follower reaches the forward limit of its movement, parts being broken away and parts shown in section;

Fig. 5 is a sectional elevation illustrating particularly the knives which slice the slab, the plane of section being indicated by the line 5—5 of Fig. 3;

Fig. 6 is an elevation of portions of the knife driving cam and cam roller mounting by which adjustments may be made for wear of the slicing knives;

Fig. 7 is a sectional view of the mounting just mentioned, the plane of section being indicated by the line 7—7 of Fig. 6;

Fig. 8 is a transverse vertical section illustrating particularly the slicing knives, the dividing knives, and the elevator by which a slice is carried upward against the dividing knives, the plane of section being indicated by the line 8—8 of Fig. 3;

Fig. 9 is a side elevation of the central dividing knife just referred to;

Figs. 10, 11 and 12 illustrate different views of the latch mechanism for holding the auxiliary dividing knives which may be thrown into or out of service at will;

Fig. 13 is an elevation of the dividing knife supporting frame and wall over which the slice is advanced to engage the dividing knives, the central knife being shown in operative cutting position and the auxiliary knives out of operative position;

Fig. 14 is a side elevation of the same dividing knife structure, illustrating the position of the latch mechanism when the auxiliary knives are out of service;

Fig. 15 is a vertical section through the dividing knife structure, the plane of section being indicated by the line 15—15 of Fig. 13;

Fig. 16 is a similar section adjacent to one of the auxiliary knives, the plane of section being indicated by the line 16—16 of Fig. 13;

Fig. 17 is a plan view of the feed bar carrier and associated parts, some of the parts being broken away for illustrative purposes;

Fig. 18 is a side elevation of the same, certain parts being shown in section, the plane of section being indicated by the line 18—18 of Fig. 17;

Fig. 19 is a side elevation of one of the fed bars withdrawn from the carrier;

Fig. 20 is a vertical section through the feed bar, the plane of section being indicated by the line 20—20 of Figs. 19;

Fig. 21 is a side elevation of the follower which abuts against the rear of the slab to advance it step by step;

Fig. 22 is a perspective view of a detached member of the follower;

Fig. 23 is a plan view of the follower;

Figure 24:
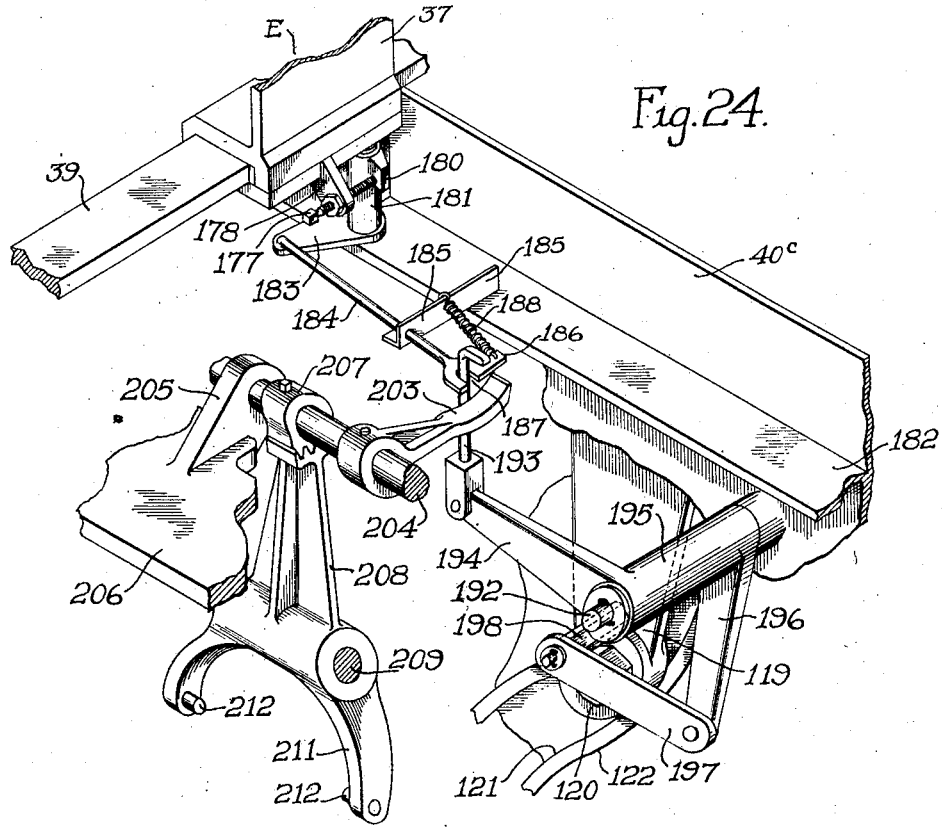
Fig. 24 is a fragmentary view of clutch actuating parts which come into play to stop the machine when the follower reaches the forward limit of its movement.

The machine in general comprises the pedestal A, the casing B which encloses the principal working parts, table C which supports the slab, the guide D along which the slab travels, the follower E which engages the rear ends of the slab to advance it, the cutting mechanism F by which the slices are severed from the end of the slab, the elevator G for raising the severed slab, the dividing knife mechanism H by which the slice is divided into two or more parts, the ejector J by which the elevated and divided slice is removed from the elevator, the delivery guide K by which the parts of the slice are separated, and the delivery table L upon which the divided slice is delivered and wrapped, packaged, or otherwise handled, as desired.

Obviously, any suitable pedestal or support may be used for the machine. The pedestal A is provided with four legs 30 having casters 31. The upper portion of the pedestal is suitably connected to the casing B which encloses the principal moving parts of the machine. For convenience in obtaining access to these parts the casing B is provided with a cover 32 which may be secured to the causing B in any suitable way, as by means of the screws 33 which have knurled heads so that they may be removed or replaced by hand.

The casing B encloses the various driving mechanisms by which the different parts of the machine are operated, as will appear more fully hereafter. The feed table C rests upon the top of the casing B and cooperates with it in enclosing the moving parts of the machine. The upper surface of the table is provided with two portions of different elevation. The portion 34 is at a slightly higher elevation than the portion 35. The latter portion is adjacent to the guide wall D and is of practically the same width as the abutting face of the follower E. When a slab rests upon the table C in position to be engaged by the follower, it lies upon the portion 35 of lower level. Because of this difference in elevation the slab is kept from slipping out of the path of the follower and thus getting out of position to be advanced by it. The guide wall D is preferably formed integral with the table top C. Adjacent to it is the enclosed space for the feed mechanism by which the follower is advanced. A cover 36 closes the space and protects the feed mechanism while the machine is in operation.

The follower E consists of a main frame or block 37 which has an abutting face 38 extending at right angles to the guide wall D when the parts are in assembled relation. It is this abutting face that presses against the rear end of the block or slab to advance it as the follower is carried forward. In its movement the follower travels forward and back upon a rectangular guide rod 39 which extends lengthwise of the machine and is secured at its center and ends to transverse main frame members 40ª, 40ᵇ and 40ᶜ by any suitable means, such as the screws 41ª, 41ᵇ and 41ᶜ. The follower also comprises a movable member or lever 42 of irregular shape connected to the main member 37 of the follower near the point where it is apertured for the passage of the bar 39. The connection is established by pivot 43 journaled in suitable bearings 44 in the member 37.

The member 42 carries a retaining pawl 45 which cooperates with the feed bar 46 when the follower is fed forward step by step. A leaf spring 47 is secured to the member 37 and bears at its free end against the under side of the pawl 45 to maintain the pawl in tooth engaging position. The free end of the member 42 is provided with a hand hold 48 which extends into a large opening 49 in the upper part of the member 37, and is adapted to cooperate with a hand hold 50 formed out of a portion of the member 37. The spring 47, besides holding the pawl in tooth engaging position, tends to hold the hand holds 48 and 50 apart.

It will be obvious that when these hand holds are drawn together, the pawl 45 will be moved out of tooth engaging position so that the follower, in so far as feed bar 46 is concerned, may be moved backward to a new starting position. In order to firmly hold the follower after it has been advanced by the feed bar 46, a toothed retaining bar 51 is employed. This bar is secured to the machine so as to be set in different fixed positions. One connection of the bar to the machine is made at bracket 52 which is provided with a close fitting opening 52ª through which the adjacent end of the bar extends and in which it is free to move for adjustment purposes. This bracket is located at the forward end of the path of travel of the follower. The other connection of the bar 51, at the rear of the path of travel of the follower, is made through intervening adjustable parts, hereinafter referred to, with the main frame portion 53 at the end of feed mechanism enclosure.

A retaining pawl 54 is pivoted to the member 37 and has a small tooth 55 which is adapted to engage the teeth 56 of the retaining bar 51. Normally, the pawl occupies an engaging position by reason of the excess of weight of the pawl on the side of its pivot upon which the tooth 55 is located. The opposite end of the pawl has an upturned nose 57, and this nose is arranged to be engaged by a cam 58 upon the member 42. When the hand holds 48 and 50 are apart the cam 58 has no engagement with the nose 57 and retaining pawl 54, therefore, remains in position to engage the bar 51. However, at the time the hand holds are moved together the cam face 58 upon lever 42 presses upon the nose 57 and forces the latter downward about its pivot so as to raise the tooth 55 clear of the ratchet teeth 56.

Thus it will be seen that when the hand holds are drawn together, both pawls 45 and 54 are moved out of engaging position. This leaves the follower free to move back and forth along the bar 39 to any position the operator may desire. Ordinarily, the hand holds are grasped when the follower reaches the forward end of its stroke, and they are held together and the follower moved backward until it is far enough removed to be beyond the rear end of the next slab which is placed upon the table. As soon as the hand holds are released, the spring 47 forces the hand hold 48 away from the hand hold 50 and leaves the pawls 45 and 54 in position to engage the teeth upon the bars 46 and 51, respectively.

As we have seen, it is the feed bar 46 which carries the follower along, and it is the retaining bar 51 which holds it against backward movement. As shown, the driving teeth 63 upon the feed bar 46 have one face approximately at right angles to the axis of the bar. The pawl 45 has a rear face which is adapted to engage this square face of the tooth 63. Consequently, when the bar 46 is moved forward, the abrupt face of the tooth 63 engages the abrupt face of the advancing pawl 45 and advances the follower. At the same time the retaining tooth 55 rests upon the toothed edge of the bar 51. At such time, the tooth 55 need not fit exactly into a space between teeth 56 but may register more or less accurately with one of the tooth spaces.

As the bar 46 moves backward in the opposite direction, it slides freely over the driving pawl 45 without causing any movement of the follower. At this time any backward pressure against the follower by the slab, due to its being shifted slightly under the action of the cutting mechanism F, merely causes the tooth 55 to seat itself, if not already seated, in a space between teeth 56. There it remains and holds the follower against further movement under pressure from the slab. The teeth 56 are so close together that this settling of the tooth 55 into a tooth space necessitates at the most only a slight movement of the follower. Indeed, the settling movement is so small as to be negligible in its effect upon the slab slice being cut at the time.

Since the weighted end of the pawl 54 is on the same side of the pivot 54$^a$ as the tooth 55, any backward movement of the followers only makes the weighted end of the pawl press the tooth 55 more firmly into the tooth space in which it lies. On the other hand any forward movement of the follower is not resisted by the teeth 55 and 56 but the former passes freely over the latter and the weighted end of the pawl 54 merely bobs up and down as the follower is advanced.

Thus, the to and fro movement of the bar 46 causes the follower to move step by step in a forward direction, the retaining pawl 54 and retaining rack 51 meanwhile bringing the follower into a settled position from which it cannot be dislodged by any back pressure upon the follower; and at any time an actuation of the member 42 frees the follower pawls 45 and 54 and leaves the follower free for shifting to a new position. Usually this freeing of the follower is indulged in only when one slab has been completely sliced and the follower must be moved back far enough to admit a new slab between it and the knives.

Since each feed bar is designed to give a certain number of slices per slab, it becomes necessary to change feed bars from time to time. Consequently, a structure must be provided which will permit this interchange of feed bars. For this purpose a feed bar frame or carrier 64 is provided and this carrier is reciprocated through the agency of a link 65 suitably connected to moving parts of the machine. The carrier comprises two long outer side bars or members 66 and 67 which are connected at their ends by short end pieces 68 and 69. The end pieces space the bars 66 and 67 and leave a pocket or slot open at the top and bottom for the reception of the feed bar 46. The space between the bars 66 and 67 is bridged at its forward end by a pin 70 which cooperates with a notch 71 in the forward end of the bar 46 to set the bar and hold it in proper position in the carrier. The opposite end of the bar is provided with a transverse pin 72 which projects from either side of the bar and is adapted to engage in notches 73 in the side bars 66 and 67. The pin 72 is held from rotation by any suitable means, as the screw 74, which passes through an opening in the pin down into a threaded opening in the bar 46.

The bar 46 may be kept from jumping upward out of its slot in the carrier by various means. In the present instance we use a button screw 74$^a$ for that purpose. The shank of the screw 74$^a$ extends into a threaded opening in one of the side bars, say bar 66, and the head is adapted to overlie a portion of the bar 46 to hold the bar in place. A segment of the head of the screw is cut away so that the screw may be rotated to a position in which no part of the head will overlie any portion of the bar. When the screw 74$^a$ is in the opening position the bar 46 may be readily inserted into or withdrawn from the carrier and when the screw is in a closing position with a bar in place, the bar is held firmly during its continued reciprocations.

At the rear end of the feed bar carrier 64 there is an overhanging stop 75 which is secured to the adjacent bearing structure by a screw bolt 76. This bearing structure includes a lining or sleeve bearing 77 fitted within and closely engaging an outer casing 78 which is in turn secured to the frame member 53. The rear end of the carrier 64 also extends into this cup shaped bearing 77 and is adapted to reciprocate therein. This lining 77 may be variously constructed. One way which we have found efficient and desirable is to place the parts 64 and 75 or their equivalent within the casing 78 to the proper extent to serve as a core and then pour hot lead or some similar metal or metal alloy into the casing about these parts. When cooled, the core is removed and the metal worked to provide the slot 79 for screw 76 and a suitable opening for bolt 80.

The connection of bolt 76 to the block 75 through the slot 79 makes it possible to adjust the stop 75 and the fine toothed bar 51 longitudinally of the machine by merely loosening up the bolt 76 and moving the stop 75 to the desired position and then tightening the bolt 77. To provide for a close and accurate adjustment of the block 76, we use the adjusting bolt 80 which extends through a threaded opening in the casing 78 surrounding the bearing 77. The inner end of the bolt 80 engages the rear end of the stop member 75. A lock nut 81 serves to hold the bolt 80 in adjusted position. For convenience in operation, the latter is provided with an angular head.

As shown, the rear end of he bar 46 is cut away so as to provide a shoulder 82 which abuts against the stop 75 to limit the rearward movement of the bar. Upon advancing from this rearmost position, in which stop 75 and shoulder 82 engage, to the foremost position, which is always the same for all bars and at all times, the bar passes through the extent of its forward stroke. The rear stroke is from the same constant foremost position back to the position wherein stop 75 and shoulder 82 engage. The position at which the stop 75 is set allows a sufficient stroke to care for the toothed arrangement of all bars 46. In other words, the teeth 63 on the bars 46 determine the advance of the follower but the stop 75 limits the rear travel of the bar. Thus the bars 46 always have the same travel for any one setting of the stop 75 but the follower is advanced through steps equal to the distance between adjacent teeth 63 on the particular bar in use at the time. Thus by the use of different bars 46 having different tooth spacing the lengths of the steps of the follower are changed. And it is the length of the travel of the follower that determines the number of slices cut from the slab.

The bearing member 77 constitutes a rear tubular guide for the rear end of the carrier 64. At its forward end the carrier finds its bearing in an opening through the bracket 52. This is preferably obtained by cutting a channel in the top of the bracket and attaching a cover $52^b$ by holding screws $52^c$. The opening thus provided is of the exact size of the carrier and has a height equal to that of the bar 46. Consequently, the latter will move freely to and fro in the opening through the bracket 52. So the forward bearing member 52 in turn may be said to constitute a forward tubular guide for the forward end of the carrier.

The distance in the clear between stop 75 and bracket 52 is always greater than the length of the rod 46, no matter what adjustment be given stop 75. Consequently, it is only necessary to bring the carrier to a position in which the bar space is beneath said clear space between parts 52 and 75, in order to place or remove a bar 46. For convenience in placing and removing the feed bars or racks 46, each bar is provided with a handle 83. To position a rack bar 46, move button $74^a$ to open position, insert the notched end of the bar into the carrier space, passing the notch 71 over pin 70, then lower the other end of the bar to seat pin 72 into notches 73, and finally move screw button $74^a$ to closed position. To remove a rack bar 46, bring the carrier to the position mentioned, then perform the above steps in the reverse order.

While referring to these parts, it may be well to note that the second toothed bar, namely the toothed retaining bar 51, is secured at its rear end to the side of a plate 84 which is bolted to the upper side of the stop member 75. Any suitable means may be provided for thus connecting the rack bar 51. In the instance shown this is accomplished by screws 85. In like manner, screw bolts 86 connect the plate 84 to the member 75. The forward end of the rack bar 51 passes into the bracket 52 within the opening $52^a$ as before noted. Whenever the stop block 75 is adjusted the bar 51 moves with it. The opening $52^a$ has a loose enough fit with the bar 51 to permit this.

In making the bars 46, care is taken to have the horizontal distance between the center of pin 70 and the center of the space occupied by pin 72 the same. Great care is also exercised to have the horizontal distance from the shoulder 82 to the adjacent end of each bar 46 exact. This distance is variable in the different bars. In fact, except for this variation and the different tooth spacing, all bars of a set are identical. It is this length which determines the position of the shoulder 82 and hence the point at which the back stroke of the bar 46 ends, as before explained. Now, in practice, we have found in a certain machine that by making this dimension $\frac{5}{16}$ of an inch, 12 slices can be cut from a slab; by making it $\frac{3}{8}$ of an inch, 11 slices; $\frac{7}{16}$ of an inch, 10 slices; $\frac{1}{2}$ of an inch, 9 slices; and $\frac{9}{16}$ of an inch, 8 slices. These relative figures are cited by way of illustration. Fixing these horizontal distances from the end of bar 46 to shoulder 82 might be replaced by fixing the horizontal distances between shoulder 82 and the center of pin 72. This would be another way of determining proper locations for the shoulders 82 of the several bars of the set.

In order to reciprocate the carrier 64 within the bearings formed in the members 52 and 76, the link 65 is connected at its rear end to a pin 92 which extends laterally from the rear end of the carrier 64. The forward end of the link 65 is pivotally connected at the point 93 to a short arm 94, in turn pivoted at 95 to a lever 96 which, in turn, is pivoted at 97 to a portion of the machine frame, and is provided at its lower end with a cam engaging roller 98 which rides upon the cam surface 99 of a cam 100 mounted upon the main cam shaft 101 of the machine. As the shaft 101 rotates the lever 96 is rocked to and fro, and as a result the link 65 communicates the reciprocations of the upper end of the lever 96 to the carrier 64. Thus, the feed bar 46 is reciprocated and the follower E is advanced step by step over the table C of the machine.

In order to maintain the roller 98 of the lever 96 against the cam surface 99, we employ a spring 102 which encircles a rod 103 pivotally connected at its forward end to the lever 96 upward of its pivot 97 and extending at its rear end through an opening in the web 104 of a portion of the frame member 40^b. Nuts 105 at the rear end of the rod 103 cause the spring 102 to bear at one end against a part fixed to the rod 103, and at the other end against the web 104. The result of this spring arrangement is that the upper end of the lever 96 is drawn rearward, and this causes the roller 98 to firmly engage the cam surface 99 at all times.

In order to allow for some play between the link 65 and the lever 96, the short lever 94 is free to move against the force of a compression spring 105^a which bears at one end against a portion of the lever 94 and at the other end against a portion of the lever 96. An adjusting screw 106 extending through the upper end of the lever 96 serves as a stop to limit the movement of the lever 94 under the action of the spring 105^a. A lock nut 107 holds the stop bolt 106 in the desired adjusted position.

It is this provision of yielding connections that enables the stop block 75 to be used in the path of travel of the shoulder 82 on bar 46. As soon as link 65 moves the carrier far enough to the rear to bring shoulder 82 and block 75 together, the action of cam 100 does not cease but the cam continues and completes its rotation. But the stopping force applied to the rearward movement of bar 46 is transmitted forward through link 65 to short arm 93 and then spring 105^a comes into play and yields. If any movement be carried back beyond spring 105^a to cam lever 96, then spring 102 will yield and take up the force thus transmitted, cam roller 98, if necessary, leaving its cam track 99.

The transversely operable knife mechanism F comprises a pair of cutting blades 108, 109 which move from opposite sides into the path of travel of the slab at its forward end to sever a slice or section from the slab. Such a piece will be in position directly above the elevator G ready to be elevated by it. The blades 108, 109 are secured to pivoted arms 110 and 111, having sector like hubs 112 and 113, respectively. These hubs are mounted in turn upon pivot stud shafts 114 and 115 suitably secured to a transverse frame member 116. The hubs 112 and 113 are provided with sets of intermeshing toothed racks 117, 118 which cause the blades 108, 109 when moving to pass through equal angular distances. In order to actuate the knives 108, 109, a projecting arm 119 is provided on one of the sectors, in the present instance sector 112. This arm 119 is provided at its lower end with an anti-friction cam roller 120 which travels in cam track 121 of driving cam 122 journaled upon the cam shaft 101. The cam track is shaped so as to rock the knives to and fro toward each other in timed relation with the other portions of the machine. As clearly shown in Fig. 3, the blades 108 and 109 are movable in a plane adjacent to the rear edge of the elevator G. Consequently, as the elevator G moves upward, it operates to strip the severed section from the knives. The structure shown is also of great strength and enables the knives to cut the hardest ice cream now manufactured. In Fig. 5 the full line position shows the cutting blades fully closed and the dotted line position shows them fully opened.

Because of the necessity of frequently sharpening the knives 108 and 109, and because of the wear upon them, it becomes necessary to adjust their positions so that they will exactly meet upon a central vertical line. To bring about this adjustment, the cam roller 120 is connected to the arm 119 by a special mounting. For this purpose a bolt 123 is threaded through a threaded opening in the end of the arm 119 and the bolt is held in place by a lock nut 124. The end of the bolt 103 is provided with an eccentric pin 125 upon which the roller 120 rotates. With this construction it is obvious that the position of the roller, with reference to a radial line extending through the pivot 114 and the center of the bolt 123, may be varied. Such shifting of the roller 120, with reference to the arm 119, enables an exact adjustment of blades 108 and 109 to compensate for wear due either to the dulling of the knives in service or the removal of a portion of the material due to sharpening them.

The elevator G comprises a platform 130 in which there are a number of slots or depressions 131. This platform is formed at the upper end of a flat vertically disposed casting 132 which extends at its edges into guides 133 and 134 formed upon a transverse frame member 135 which is suitably secured to the casing and other portions of the frame structure. The lower end of the elevator is provided with a cam roller 136 which travels in a cam track 137 in cam 138 mounted upon cam shaft 101. The cam 138 is shaped so as to maintain the elevator in its lowermost position during a half revolution of the shaft, and then to elevate the same to its full position and hold it there for a short period during the other half revolution of the shaft. This cam is arranged so as to operate in proper timed relation with the other moving parts of the machine.

As the section of material is moved upward by the elevator G it encounters the dividing knives of the cutting mechanism H. In the ordinary operation of the machine there is a central fixed knife 141 which is secured adjacent to a wall 142 along which the slice travels during its elevation by the elevator G. The knife 141 is a fixed protruding knife.

It is positioned so as to lie just above the top of the slice after it has been cut off and before the elevator begins to raise it. As soon as the slice begins to rise the knife 141 enters into the material of the slice and divides it into two equal parts as the upward motion continues. The wall 142 is part of a frame structure 143 which is secured to the upper part of the transverse frame member 135 by suitable means such as the screws 144.

The central knife 141 has the outline shown in Fig. 9. Its rear edge is provided with a rectangular slot 145 and a slot 146 having a circular end. Its lower edge is provided with a rectangular slot 147. These slots are for the purpose of securing the knife firmly to the frame 143. As shown more particularly in Fig. 15, the frame includes a transverse member 148 which enters the slot 145, and a rod 149 which fits the slot 146. When the parts 148 and 149 are fitted into their slots, then the transverse member 150 is fitted into the slot 147 on the under side of the knife and secured to the wall 142 by suitable means such as screws 151. Thus a firm and substantial mounting is provided for this central fixed knife which must carry a considerable load when cutting hard cream. The forward end of the knife 141 is also provided with an extension 152 which engages in a slot 152$^a$ formed in the lower edge of a frame 152$^b$ of the machine so as to add rigidity to the knife. This is desirable in order to handle ice cream brought to a low temperature such as is now commonly employed in many plants. The frame 152$^b$ lies just rearward of the slicing knives 108 and 109 and extends upward beyond them. The end 152 of the knife rests upon the bottom of a vertical slot cut in the portion 152$^a$ of this auxiliary frame.

The central knife 141 may be supplemented by two auxiliary knives 153 located on opposite sides of the knife 141. In the embodiment shown the knives 153 may be placed in operation or not, as desired. To make this possible, these knives are mounted upon the rod 149 which extends through the vertical members of the frame 143. In order to prevent the knives 153 from rotating upon the rod 149, the latter is thickened at the points where the knives 153 are located so as to provide in each case a U-shaped section 154 which fits into a similar slot formed in the base of the knife 153. To provide ample bearings for the rod 149, supplemental members 155 are secured to the wall 142 adjacent to the vertical members of the frame 143. These are secured in the case illustrated by screws 156. The auxiliary knives 153 are mounted so as to move with the rod 149. The latter is provided at one end with an angular head 157 which is firmly secured to the rod. As shown in Fig. 12, a portion of the head 157 is cut away to provide a flat face 158. Another cooperating face is the flat face 159. With these faces a latch 160 is adapted to cooperate. This latch is pivoted at the point 161 to a side member of the frame 143. A spring 162 secured at one end to the same side member and at the other end to the latch 160, tends to hold the latter down against one of the faces 158 and 159, as the case may be, of head 157.

When the head 157 is in the position illustrated in Fig. 14, the knives 153 occupy the full line position shown in Fig. 16. In other words, at that time they are idle. When the parts are shifted so that the latch engages the face 158, then the knives 153 occupy the protruding dotted line position of Fig. 16. Then they are in their work positions. A pin 163 secured to the adjacent member of the frame 143 prevents movement of the triangular member 153 into any other than the positions mentioned. In other words, the latch 160 can only engage faces 158 and 159. Whenever the knives 153 are to be put into service, it is only necessary for the operator to pull up on the latch 160 and properly position the rod 143. Although two knives 153 are shown as auxiliary to the main knife 141, yet it must be understood that more knives might be employed if desired, and one or more of these might be made adjustable or not, as desired.

The knives 141 and 153 are spaced the same as the kerfs in the upper face of the elevator member 130 so that when the elevator is fully raised the knives will pass into the kerfs and thus completely cut the cream slice throughout its full height.

In order to remove the section or slice when it has been cut into its parts, several ways suggest themselves. One way would be to pick up the pieces by hand, using suitable wrappers for the purpose. Another way would be to tip over the pieces upon wrappers laid upon the adjacent table. Still another way is that illustrated, namely to use the ejector mechanism J to thrust the severed and divided slice from the surface of the elevator G. In this instance the ejector is a simple plunger 166 having a rearwardly extending rod 167 movable within a casing 168 through the agency of a handle 169 extending upwardly through a slot in the casing. In other instances, the plunger 166 might be automatically actuated by the machine parts. However, for the purposes of the present disclosure the hand operation will suffice.

When the plunger is operated to advance the severed section, the latter is forced from the elevator on to the delivery guide K. This part of the machine consists of a simple sheet metal support having a bottom 170 and side walls 171 and 172. Preferably, the walls are in plan arranged in V-shape with the point extending toward the ejector J. As sections are advanced over this guide, they are forced apart by the inner walls. They may then be taken from the guide by hand and placed in packages or cartons, or otherwise disposed of.

Obviously, wrapper sheets may be placed upon the delivered product at any suitable point. In another application we are disclosing means for mechanically applying wrappers to the product, but it seems unnecessary to disclose such mechanism in the present case, which is directed more particularly to the material feeding and cutting mechanisms. Where a space is left between the inner walls 171 and 172, the guide K has two outlets. In some instances, cartons may be slipped over the ends of these portions of the guide and the product placed in these cartons by hand. If desired, the product may be delivered from the guide K directly to the table L. Or, again, the guide K may be dispensed with and the ejector may be used to force the material outward upon the table L.

The delivery table is of any suitable construction, and in the embodiment shown extends far beyond the casing B and is supported by direct connection with the casing and by brace rods 173 secured at their upper ends to outer portions of the table, and at their inner ends to a lower portion of the casing B.

In connection with the operation of the follower E, it is important to provide against the follower going forward too far. In other words, after the slab has been fully sliced the onward movement of the follower should cease. In order to bring this about, we have arranged to stop the entire machine when the follower reaches the limit of its forward movement. The mechanism for accomplishing this is shown quite fully in Fig. 24. As shown there and elsewhere, the follower has on its under side a screw bolt 177 which is threaded through a threaded opening in a lug 178 on the under side of the member 37 of the follower. This bolt 177 may be adjusted to different positions and held in place by a lock nut 179. The bolt 177 is positioned so as to engage an outwardly extending arm 180 of a bell crank lever 181 which is suitably journaled upon the horizontal web 182 of frame member 40c of the machine.

The other arm 183 of the bell crank lever 181 is connected at its outward end to a reciprocating rod 184 which extends through an opening in a guide arm 185. The free end of the rod 184 is provided with a plate 186 having a notch 187. A portion of the plate is connected by a coil tension spring 188 to the arm 185 secured to the web 182. The spring 188 tends to hold the reciprocating rod 184 in one position. This is the position which brings the bell crank arm 180 farthest to the rear. It will be seen that when the follower advances and its bolt 177 engages the arm 180, the bell crank lever 181 will be rotated and the arm 184 advanced in opposition to the tension of the spring 188.

Cooperating with the reciprocating rod 184 is a hook 193 which extends at its upper end into notch 187 of rod 184 and is pivoted at its lower end to the outer end of the arm 194 of a bell crank lever 195 mounted upon a suitable bearing pin 192 upon the main frame member 40c. The other arm 196 of the bell crank lever 195 is connected to a link 197 which is pivotally secured at its other end to a stud 198 which extends rearward from the knife actuating member 119. Thus as the slicing knives move toward and from each other as a result of cam roller 120 traveling in cam track 121 of cam 122, so bell crank lever 195 rocks and hook 193 rises and falls. These motions continue as long as the cam shaft 101 is rotating and this means as long as the machine is in operation.

Directly beneath the point of the hook 193 is an arm 203 which is secured to a clutch shaft 204 which is mounted for rotation in bearings provided in arms 205 extending from the transverse frame member 206. The clutch shaft 204 carries a gear segment 207 which is fixed to it. The teeth of this gear segment engage the teeth of a second gear segment 208 mounted upon another shaft 209 journaled in a hanger frame 210. The segment 208 carries at its lower end a yoke 211 with pins 212 which are adapted to engage opposite sides of the slot 213 in the clutch 214 by which the cam shaft 101 is thrown into gear with the main drive shaft of the machine. When the hook 193 is thrust forward by the rod 184 so as to have its point engage the adjacent arm 203, then the shaft 204 is rotated and the yoke 211 throws the clutch so as to disconnect the shaft 101. The various operating parts of the machine are operated from the shaft 101. Consequently, when it is thrown out of clutching engagement with the driving motor, the machine stops. The shaft 204 is provided at its outer end with a hand lever 215 by which the shaft 204 may be rocked and the clutch thrown to operatively connect the cam shaft with the driving motor.

The motor for driving the machine is preferably an electric motor 220 secured to the frame of the machine within the casing B. A chain belt 221 connects the driving pinion of the motor with a sprocket wheel 222 upon a transverse shaft 223 which is provided with a worm which drives the worm gear wheel 224 to drive the main drive shaft 225 of the machine journaled within the casing 226 secured to the hanger 210. It is this shaft which is thrown into driving relation with the cam shaft 101 whenever the clutch 214 is operated.

The shaft 101 is in line with the drive shaft 225 and is supported at one end by hanger 210 and at the other end by a hanger 227 secured to the main frame. The shaft 101 shown might have been made shorter, but in the embodiment constructed other operations were performed which required extra cams on this shaft, and consequently the present disclosure is in keeping with the actual embodiment of the invention heretofore perfected.

The main frame itself may be variously constructed. As we have seen, it consists principally of a casing. This casing may be made up of several units or not, as desired, or as found expedient when designing the machine. Preferably, the shell of the casing is provided with ribs or web-like members which strengthen it and provide for carrying the auxiliary transverse frames and other parts. So in the embodiment shown there are web-like members 228 and 229 which extend lengthwise of the casing and serve for the easy attachment of the transverse frames 116, 135 and 237. In Fig. 8 frame 135 is shown connected to these webs by bolts 230. Frame 116 carries the knives 108 and 109 of the cutting mechanism F. Frame 135 carries the elevator G. And frame 237 which ordinarily carries other parts not necessary to the present disclosure, completes the assembly of transverse frames. These transverse frames are connected together by bolts or rods 231. Thus a rigid and substantial frame structure is provided for the machine.

The casing form of frame is very desirable. It confines all machinery oil, dust and dirt within an enclosure and thus keeps it away from the materials upon which the machine is being used. In feeding and cutting ice cream slabs this is of the greatest importance. It is absolutely essential that the highest sanitary conditions be maintained. So in the embodiment shown the principal moving parts are contained in the casing B. As oil may drip from the several parts and thus a quantity be accumulated within the casing, we have provided an outlet 232 at one end of the casing and an inclined bottom leads to this outlet. In this way it will be possible to easily drain the casing. A suitable cap may be employed for closing the opening.

Since a number of feed bars 46 are likely to be used, provision has been made for storing them upon the machine. A shelf 233 at one side of the machine serves this purpose. The electrical circuits are not shown, but it will be understood that the motor 220 is wired up with a starting box 234 secured, for example, to one end of the casing B beneath the table L.

Figures 25, 26, 27, 28:
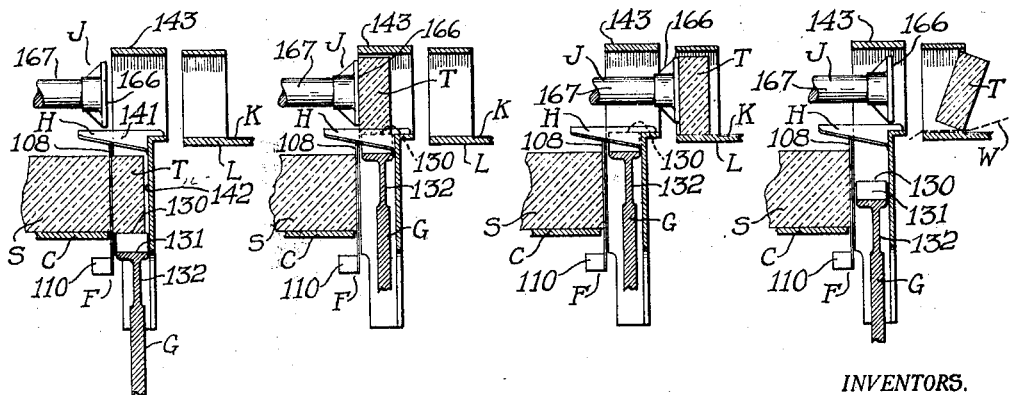
Figs. 25, 26, 27 and 28 are diagrammatic views illustrating the steps in the operation of the machine by which a slice is severed, elevated, and ejected on to the delivery table. Throughout these views like characters refer to like parts.

Having carefully explained all the parts of the machine, it may not be out of place, by way of conclusion, to follow the course of the material through the machine as graphically illustrated in Figs. 25 to 28 inclusive. As there shown, a slab S of material, such as ice cream in a hard frozen condition, is placed upon the table C and fed step by step by the feed mechanism of the machine. If the slab is started with its forward end in the plane of the cutting blades of the mechanism F, then the first step will advance it a distance equal to that between the teeth 63 of the particular cutter bar 46 which is being used. As before noted, the selected bar will be that which will give the desired number of slices per slab. As soon as the forward step has been completed and the end of the slab is in position to be cut, the cutting mechanism F operates and severs a section T from the end of the slab. This cutting operation is shown in Fig. 25 as occurring or having just been completed.

The next operation is the elevation of the section T and a withdrawal of the blades of the cutting mechanism F. The elevation is brought about by the elevator G moving to strip the section T from the blades of the cutting mechanism F, and at the same time to force the second against and beyond the knives of the dividing cutting mechanism H. Thus when the elevator G has completed its upward travel, as shown in Fig. 26, the section T is completely elevated to the level of the table L, and stands upon the elevator in such position, divided into two or more parts according to the setting of the dividing knife mechanism H.

Before the elevator starts downward, the plunger mechanism J must be operated to force the parts of section T from the elevator on to the table L. The plunger of the mechanism J which brings this about is, in the present instance, operated by hand and all the parts of the section T move as one unit. When the parts have been dislodged by the plunger mechanism J, they occupy the position illustrated in Fig. 27. From that position they may be moved in any desired way. Their removal may be by hand or otherwise, as desired.

In the present instance, the section T is shown in Fig. 28 as tilted upon one corner. This shows one way of handling the section so as to bring it upon a wrapper W. When the section is treated in this way, it is necessary to place the wrapper W in position and hold it so that the section T may be moved upon it when ejected by the mechanism J. If the section T is to have its parts handled separately, then an individual wrapper W must give way to a plurality of wrappers, one for each section to be wrapped. Where the section is divided into two parts, then the parts upon their respective wrappers may be separated by the spreading action of the delivery guide K, as heretofore explained. In some cases it may be desirable to slip a wrapper, or wrappers, W down between the end of the ejector plunger 166 and the adjacent slice T, or its parts, so as to prevent the slice from sticking to the plunger.

In carrying out our invention it will be apparent that many alterations and modifications may be made in details of the structure herein disclosed without departing from the spirit and scope of the invention. We, therefore, aim to cover by the terms of the appended claims all those alterations and modifications which rightly come within the scope of the invention.

What we claim as new and desire to secure by Letters Patent of the United States is:

1. In a machine of the class described, a feed table along which a block of material may be fed, means for severing sections from the forward end of said block as it advances, a follower having an abutting face for engaging the rear end of said block, a longitudinally reciprocating feed bar frame having a longitudinal bar-receiving space, positioned in said space a removable feed bar having a longitudinal row of ratchet teeth, a second toothed bar extending parallel to said removable feed bar, an advancing pawl pivoted to said follower and operative to be engaged and disengaged by the teeth of said removable feed bar to advance said follower, a retaining pawl pivoted to said follower and operative to engage the teeth of said second toothed bar to hold the follower firmly in the positions to which it is advanced by said advancing pawl, a portion of said follower forming a hand hold, a lever pivoted to said follower and movable with said advancing pawl and having a hand hold movable toward and from said first mentioned hand hold to free said advancing pawl when said hand holds are drawn toward each other and to cause said advancing pawl to engage said removable feed bar when said hand holds are far apart, and means on said hand hold lever for engaging and disengaging said retaining pawl from said second toothed bar in accordance with the engagement and disengagement respectively of said advancing pawl with said removable feed bar.

2. In a machine of the class described, a feed table along which a block of material may be fed, means for severing sections from the forward end of said block as it advances, a follower having an abutting face for engaging the rear end of said block, a longitudinally reciprocating feed bar frame having a longitudinal bar receiving space, positioned in said space a removable feed bar having a longitudinal row of ratchet teeth, a second toothed bar extending parallel to said removable feed bar, an advancing pawl pivoted to said follower and operative to be engaged and disengaged by the teeth of said removable feed bar to advance said follower, a retaining pawl pivoted to said follower and operative to engage the teeth of said second toothed bar to hold the follower firmly in the positions to which it is advanced by said advancing pawl, a portion of said follower forming a hand hold, a lever pivoted to said follower and movable with said advancing pawl and having a hand hold movable toward and from said first mentioned hand hold to free said advancing pawl when said hand holds are drawn toward each other and to cause said advancing pawl to engage said removable feed bar when said hand holds are far apart, and a cam face on said hand hold lever for shifting said retaining pawl into and out of engagement with said second toothed bar in accordance with the engaging and disengaging respectively of said advancing pawl with said removable feed bar.

3. In a machine of the class described, a feed table along which a block of material may be fed, forward and rear guides, a feed bar carrier movable to and fro in said guides, said carrier containing a space for receiving the feed bar, a feed bar for said space, means for accurately positioning said feed bar in said space, means including yielding connections for reciprocating said carrier and contained feed bar, a shoulder on said bar near its rear end, a stop on the machine operative to engage said shoulder to limit the backward movement of said carrier and contained bar, and a follower movable along said table step by step in response to the reciprocations of said carrier and bar.

4. In a machine of the class described, a feed table along which a block of material may be fed, slicing knives at the forward end of said table, forward and rear guides, a feed bar carrier movable to and fro in said guides, said carrier containing a space for receiving the feed bar, a removable toothed feed bar for individual use in said space, means for accurately positioning said bar in said space, means including yielding connections for reciprocating said carrier and contained feed bar, a shoulder on said bar near its rear end, a stop on the machine for engaging said shoulder when said bar is in use to limit the backward movement of said carrier and contained feed bar, a follower movable along said table step by step in response to the reciprocations of said carrier and bar, and means for actuating said slicing knives in timed relation with said reciprocating means to sever slices from the block successively as the block is advanced step by step.

5. In a machine of the class described, a feed table along which a block of material may be fed, forward and rear guides, a feed bar carrier movable to and fro in said guides, said carrier comprising long side members and short end members shaped to provide a longitudinal space for receiving a feed bar, a feed bar for said space, means for accurately positioning the forward end of said bar in said space, means for accurately positioning the rear end of said bar in said space, means including yielding connections for reciprocating said carrier and contained feed bar, a shoulder on said bar near its rear end, a stop on the machine operative to engage said shoulder to limit the backward movement of said carrier and contained bar, and a follower movable along said table step by step in response to the reciprocations of said carrier and bar.

6. In a machine of the class described, a feed table along which a block of material may be fed, cutting means for severing slices from said block as it is fed over said table, forward and rear guides at the ends of said table, a feed bar carrier movable to and fro in said guides, said carrier comprising long side members and short ends, the latter spacing said side members, a stop adjustably secured to said rear guide and projecting over the rear end of the space between the side members of said carrier when the latter is in its rearmost position, a removable toothed feed bar individually fitted into the space in said carrier and cooperating with said stop to limit the rearward movement of said carrier, said bar having a stop element for engaging said overhanging stop and spaced feeding teeth, a fixed retaining bar also having teeth along its edge, means for reciprocating said carrier, a follower, advancing and retaining pawls on said follower positioned to cooperate with the teeth on said feed and retaining bars respectively, means for reciprocating said carrier, and means for operating said cutting means in timed relation to the reciprocations of said carrier.

7. In a machine of the class described, forward and rear guides, a feed bar carrier movable to and fro in said guides, said carrier comprising long side members and short ends secured together to form a central longitudinal slot open top and bottom for receiving a feed bar, a transverse pin across said slot at its forward end, an adjustable stop at the rear end of said carrier, in combination with a toothed feed rack adapted to fit snugly in said slot with its teeth down, said rack having a notch in its forward end to fit over said transverse pin and a shoulder near its rear end to cooperate with said stop, a transverse pin secured to said rack toward its rear end and operative to lie in notches in the side members of said carrier, said transverse pins cooperating to rightly position said feed bar in said slot in said carrier, and a button for holding the bar down in the slot.

8. In a machine of the class described, forward and rear guides, a feed bar carrier movable to and fro in said guides, said carrier comprising long side members and short ends secured together to form a central longitudinal slot open top and bottom for the reception of the feed bar, a transverse pin at the forward end of said slot extending across the same, and an adjustable stop above the rear end of said carrier extending forward far enough to overlie the rear end of said slot when said carrier is in its rearmost position.

9. In a machine of the class described, a forward tubular guide, a rear guide, a feed bar carrier movable to and fro in said guides, the forward end of said carrier snugly fitted to slide in the tubular opening of said forward guide and having a longitudinal pocket extending throughout the greater portion of its length, said pocket being for the reception of a feed bar, a toothed feed bar adapted to fit into said pocket, said bar having a stop shoulder near its rear end, and a stop for cooperating with said shoulder, said stop being fixed independently of said carrier near the rear end of said carrier.

10. In a machine of the clasp described, a feed table, guides, a carrier movable to and fro in said guides, said carrier containing a longitudinal pocket, a removable toothed feed bar adapted to be individually seated in said pocket, a stop element on said feed bar, a stop on said carrier for cooperating with the feed bar stop element when in use, a retaining bar having a row of retaining teeth of small size and pitch, a follower, and advancing and retaining pawls on said follower positioned to cooperate with said feed teeth and said retaining teeth respectively.

11. In a machine of the class described, a feed table, guides, a carrier movable to and fro in said guides, said carrier containing a longitudinal pocket, a removable toothed feed bar adapted to be individually seated in said pocket, a stop element on said feed bar, a stop on said carrier for cooperating with said stop element when in use, a retaining bar having a row of retaining teeth of small size and pitch, a follower, advancing and retaining pawls on said follower for cooperation with said feed teeth and retaining teeth respectively, transversely operable knife mechanism for severing material advanced by said follower, the material when hard being firmly held by the small teeth on the retaining bar and the retaining pawl on the follower against any backward displacement by the knife action, and means for operating said knife mechanism and reciprocating said carrier in timed relation.

12. In a machine of the class described, a feed table for supporting a block of material, means for moving said block forward intermittently, and cutting means for severing sections successively from the front end of said block comprising two cutter blades movable toward and from each other, pivoted arms on which said blades are mounted, intermeshing toothed racks on said arms for insuring equal angular movements of said blades, a projection on one of said arms, an eccentric pivot on said projection, an antifriction roller on said eccentric pivot, a cam for engaging said roller to rock said arms and blades toward and from each other, and a mounting for said eccentric pivot whereby said pivot may be rotated to vary the position of said roller relative to said projection and thus to alter the throw of said knives.

13. In a machine of the class described, a feed table for supporting a block of material, means for moving said block forward intermittently, and cutting means for severing sections successively from the front end of said block comprising two cutter blades movable toward and from each other, pivoted arms on which said blades are mounted, intermeshing toothed racks on said arms for insuring equal angular movements of said blades, a driving cam, a projection on one of said arms positioned to engage said cam to rock said arms, and means for varying the relative positions of said cam and projection to alter the throw of said blades.

14. In a machine of the class described, an elevator for raising a severed section of material, a wall along which said section travels as it is being raised, a fixed knife protruding from said wall into the path of travel of said section, a pair of auxiliary knives one on each side of said fixed knife pivoted to said wall and movable into protruding positions like said fixed knife and into idle positions out of the path of travel of said section, means for holding said auxiliary knives in said respective positions, and wall portions backing up said auxiliary knives for efficient work when in their protruding positions.

15. In a machine of the class described, an elevator for raising a severed section of material, a wall along which said section travels as it is being raised, a fixed knife protruding from said wall into the path of travel of said section, a pair of auxiliary knives one on each side of said fixed knife pivoted to said wall and movable into protruding positions like said fixed knife and into idle positions out of the path of travel of said section, an angular head secured to the pivot of said auxiliary knives, a spring actuated latch cooperating with said head to hold said auxiliary knives in said respective positions, and wall portions backing up said auxiliary knives for efficient work when in their protruding positions.

16. In a machine of the class described, a drive shaft, a cam shaft, a clutch for operatively connecting said shafts, a table, a follower, means operated from said cam shaft to advance said follower step by step along said table, a clutch lever, a clutch shaft, means operated by said clutch shaft to operate said clutch lever, an actuating arm, means driven from said cam shaft to continuously rock said actuating arm, a clutch shaft arm, a hook pivoted to the outer end of said actuating arm and movable into and out of the path of travel of said clutch shaft arm, and means actuated by said follower when it reaches the end of its forward travel to throw said hook into the path of travel of said arm whereby said arm is rocked and said clutch is shifted to disconnect said cam shaft from said drive shaft.

17. In a machine of the class described, a drive shaft, a cam shaft, a clutch for operatively connecting said shafts, a table, a follower, means operated from said cam shaft to advance said follower step by step along said table, a clutch lever, a clutch shaft, means operated by said clutch shaft to operate said clutch lever, an actuating arm, means driven from said cam shaft to continuously rock said actuating arm, a clutch shaft arm, a hook pivoted to the outer end of said actuating arm and movable into and out of the path of travel of said clutch shaft arm, a reciprocating rod for engaging said hook but operative when in normal position to allow said hook to remain out of the path of travel of said actuating arm, a spring normally holding said rod in said inactive position, and a bell crank lever having one arm connected to said rod and the other arm extending into the path of travel of a portion of said follower, whereby when engaged by said follower the bell crank actuates said rod to bring said hook into driving engagement with said clutch shaft arm to shift said clutch into disconnecting position.

18. In a machine of the class described, a feed table along which a block of material may be fed, slicing knives at the forward end of said table, forward and rear guides, a feed bar carrier movable to and fro in said guides, said carrier containing a space for receiving the feed bar, a removable toothed feed bar for individual use in said space, means for accurately positioning said bar individually in said space, means including yielding connections for reciprocating said carrier and contained feed bar, a shoulder on said bar near its rear end, a stop on the machine for engaging said shoulder when said bar is in use to limit the backward movement of said carrier and contained feed bar, a follower movable along said table step by step in response to the reciprocations of said carrier and bar, the advance step of the follower corresponding to the spacing of the teeth upon said feed bar and means for actuating said slicing knives in timed relation with said reciprocating means to sever slices from a block successively as the block is advanced step by step, said carrier feed bar receiving space being adapted to receive other feed bars like said first mentioned feed bar except for the spacing of the teeth and the location of said shoulders, the spacing of the teeth being different on different bars to provide for correspondingly different slices per standard block of material.

19. In a machine of the class described, a feed table along which a block of material may be fed, cutting means for severing slices from said block as it is fed over said table, forward and rear guides at the ends of said table, a feed bar carrier movable to and fro in said guides, said carrier comprising long side members and short ends, the latter spacing said side members, a stop adjustably secured to said rear guide and projecting over the rear end of the space between the side members of said carrier when the latter is in its rearmost position, a removable toothed feed bar individually fitted into the space in said carrier and cooperating with said stop to limit the rearward movement of said carrier, said bar having spaced feeding teeth and a stop element for engaging said overhanging stop, a fixed retaining bar also having teeth along its edge, means for reciprocating said carrier, a follower, advancing and retaining pawls on said follower positioned to cooperate with the teeth on said feed and retaining bars respectively, means for reciprocating said carrier, and means for operating said cutting means in timed relation to the reciprocations of said carrier, the space between the ends and side bars of said carrier being adapted to receive other feed bars like said first mentioned feed bar except that their stop elements for engaging said overhanging stop are differently positioned and the feed teeth on the different bars are differently spaced to provide for different numbers of slices to be cut from standard blocks.

20. In a machine of the class described, a feed table, guides, a carrier movable to and fro in said guides, said carrier containing a longitudinal pocket, a removable toothed feed bar adapted to be individually seated in said pocket, a stop element on said feed bar, a stop on said carrier for cooperating with the feed bar stop element when in use, a retaining bar having a row of retaining teeth of small size and pitch, a follower, and advancing and retaining pawls on said follower positioned to cooperate with said feed teeth and said retaining teeth respectively, said pocket serving to receive other toothed feed bars like said first mentioned feed bar but having differently spaced teeth and differently positioned stop elements to insure feed stops of different lengths.

21. In a machine of the class described, a feed table, guides, a carrier movable to and fro in said guides, said carrier containing a longitudinal pocket, a toothed feed bar adapted to be individually seated in said pocket, a stop element on said feed bar, a stop on said carrier for cooperating with said stop element when in use, a retaining bar having a row of retaining teeth of small size and pitch, a follower, advancing and retaining pawls on said follower for cooperation with said feed teeth and retaining teeth respectively, transversely operable knife mechanism for severing material advanced by said follower, the material when hard being firmly held by the small teeth on the retaining bar and the retaining pawl on the follower against any backward displacement by the knife action, and means for operating said knife mechanism and reciprocating said carrier in timed relation, said pocket being capable of receiving other toothed feed bars like said first mentioned feed bar but having differently spaced teeth and differently positioned stop elements to provide feed steps of different lengths.

In witness whereof, we have hereunto affixed our signatures this 18th day of November, 1929.

HARLEY R. PHILLIPS.
HENRY J. CLARKE.